United States Patent [19]

Tokuoka et al.

[11] 4,113,528
[45] Sep. 12, 1978

[54] METHOD OF PREVENTING DETERIORATION OF CHARACTERISTICS OF FERROMAGNETIC METAL OR ALLOY PARTICLES

[75] Inventors: Yasumichi Tokuoka; Kazumasa Fukuda, both of Tokyo, Japan

[73] Assignee: TDK Electronics Co., Ltd., Tokyo, Japan

[21] Appl. No.: 744,115

[22] Filed: Nov. 22, 1976

[30] Foreign Application Priority Data

Dec. 8, 1975 [JP] Japan .................... 50-146161

[51] Int. Cl.$^2$ ............................. H01F 1/09
[52] U.S. Cl. ................. 148/105; 75/0.5 AA; 148/108; 252/62.54; 252/62.55
[58] Field of Search .............. 148/105, 108; 75/0.5 AA; 252/62.55, 62.54

[56] References Cited

U.S. PATENT DOCUMENTS

| 3,206,338 | 9/1965 | Miller et al. ................. 148/105 |
| 3,520,676 | 7/1970 | Stahr et al. .................. 75/0.5 AA |
| 3,782,706 | 1/1974 | Muhlpfordt .................... 148/105 |
| 3,837,912 | 9/1974 | Roden ........................ 252/62.54 |
| 3,865,627 | 2/1975 | Roden et al. ................ 252/62.54 |
| 3,954,520 | 5/1976 | Beaulieu et al. ............... 148/105 |
| 3,966,510 | 6/1976 | Aonuma et al. ................ 148/105 |

OTHER PUBLICATIONS

Latimer; W. et al., *Reference Book of Inorganic Chemistry*, New York, 1951, p. 374.

*Primary Examiner*—W. Stallard
*Attorney, Agent, or Firm*—Oblon, Fisher, Spivak, McClelland & Maier

[57] ABSTRACT

Ferromagnetic metal or alloy particles are prepared by reducing ferromagnetic metal ions in the solution with a reducing agent under a magnetic field to obtain a slurry of ferromagnetic metal or alloy particles and adding an oxidizing agent to an aqueous slurry containing the ferromagnetic metal or alloy particles to prevent deterioration of magnetic characteristics.

4 Claims, 5 Drawing Figures

METHOD OF PREVENTING DETERIORATION OF CHARACTERISTICS OF FERROMAGNETIC METAL OR ALLOY PARTICLES

BACKGROUND OF THE INVENTION

The present invention relates to a method of preventing deterioration of magnetic characteristics of ferromagnetic metal of alloy particles which are obtained by a reduction in a liquid phase.

When boron hydride such as sodium boron hydride is added to a solution containing ferromagnetic metal ions such as iron, cobalt and nickel ions, the reaction is vigorously performed to precipitate black ferromagnetic metal or alloy under generating hydrogen gas. It has been known that when the reaction is performed in magnetic field, the ferromagnetic acicular particles extended to the direction of magnetic field. Recently, the demand of high density magnetic recording medium has been increased, and the demand of acicular metal or alloy particles which are obtained by said method has been increased.

The inventors have previously invented and proposed the process for effectively preparing ferromagnetic metal or alloy particles by said method.

SUMMARY OF THE INVENTION

It is an object of the present invention to provide a method of preventing deterioration of characteristics of ferromagnetic metal or alloy particles.

The object of the invention has been attained by adding an oxidizing agent to an aqueous slurry containing ferromagnetic metal or alloy particles which are obtained by a reduction in a liquid phase.

DETAILED DESCRIPTION OF THE PREFERRED EMBODIMENTS

The inventors have previously invented and proposed the process for effectively preparing ferromagnetic metal or alloy particles by the abovementioned method.

Figure 1:
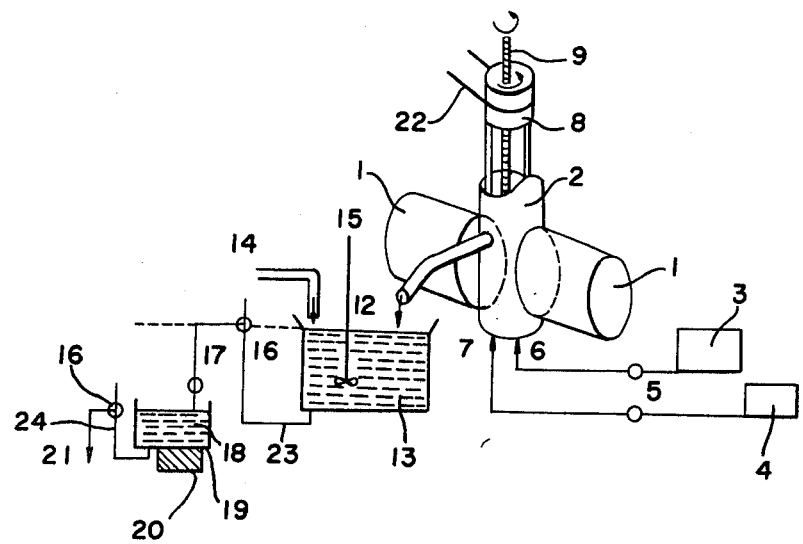
FIG. 1 is a schematic view of a system for preparing ferromagnetic metal or alloy particles.
Figure 2:
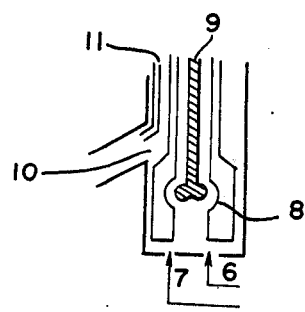
FIG. 2 is a sectional view of the reactor of FIG. 1.
Figure 3:
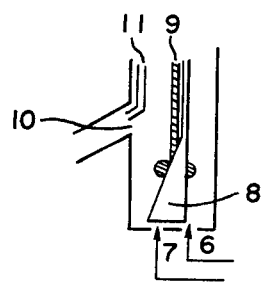
FIG. 3 is a sectional view of the reactor of FIG. 1 wherein a plate is turned.

Referring to FIGS. 1 to 3, the process will be illustrated. In FIG. 1, two columnar permanent magnets 1 are closely fixed on the outer surface of a reactor 2 made of non-magnetic material. The solutions of the starting materials are respectively fed from a tank 3 containing a solution of a reducing agent such as sodium boron hydride and a tank containing a solution of a ferromagnetic metal salt such as ferrous sulfate, cobalt chloride through each inlet 6 or 7 to the reactor 2 by a pump 5.

As shown in FIG. 2, the reactor 2 is equipped with a stirrer 9 which is rotated by a motor (not shown). In the reactor, the metal salt is reduced to form ferromagnetic metal or alloy particles. The slurry of the particles is moved along a rotary particle conveying plate 8 to upper part of the reactor 2.

The rotary particle conveying plate 8 has a structure for moving the slurry to the upper part by the rotation. The upper end of the plate 8 is connected to a pulley 8' which is concentrically fitted with the stirrer 9 and the pulley 8' is rotated by a belt 22 which is driven by the other motor.

The slurry moved to the upper part of the reactor 2 is passed through an outlet 10 and a pipe 12 to a washing tank 13 under the assistance of the flow discharged from a pipe 11 for particle conveying flow which is disposed near the outlet 10.

The washing tank 13 is equipped with a stirrer 15 and the ferromagnetic particles in the slurry are washed with a water fed through a pipe 14 for washing water, while stirring by the stirrer. The washed ferromagnetic particles are fed together with the solution through a pipe 23, a valve 16, a valve 17 to a recovery tank (reclaimer) 18 for ferromagnetic particles.

The level of the valve 16 is same with the level of the solution in the washing tank 13.

Accordingly, the solution is automatically flowed out when the level of the valve in the open state.

A magnet for recovery 20 is disposed at the outer surface of the bottom of the recovery tank 18 whereby the ferromagnetic particles 19 are remained at the bottom of the recovery tank 18.

The solution is discharged through a pipe 24 and the valve 16 whose level is same with the level of the solution in the recovery tank 18. The operation is stopped at desired time and all contents in the recovery tank 18 are discharged to recover the ferromagnetic particles 19. It is possible to dispose a magnetic drum connected with a belt, in the recovery tank 18 instead of using magnet for recovery, whereby the ferromagnetic particles can be deposited on the belt and continuously recovered.

In the process of the invention, the ferromagnetic metal ions can be $Fe^{2+}$, $Fe^{3+}$, $Co^{2+}$, $Ni^{2+}$ and a mixture thereof and the ions are in the form of the water soluble salts such as sulfate, nitrate, chloride etc.. The concentration of the ferromagnetic metal salt is usually in a range of 0.1 to 2 mole/liter and especially about 1 mole/liter.

Suitable reducing agents include sodium or potassium boron hydride and the concentration of the reducing agent is usually in a range of 0.1 to 2 mole/liter especially about 1 mole/liter.

Suitable oxidizing agents include hydrogen peroxide, potassium permanganate, sodium chromate, sodium nitrite etc..

The concentration of the oxidizing agent can be enough to oxidize the surface of the ferromagnetic metal or alloy particles and is depending upon the rate of the addition of the oxidizing agent. The volume of the washing tank and the velocity of the formation of the ferromagnetic metal or alloy particles, and is usually in a range of $1 \times 10^{-3}$ to $10^{-1}$ mole/liter, preferably $1 \times 10^{-3}$ to $9 \times 10^{-3}$ mole/liter.

Figure 4:
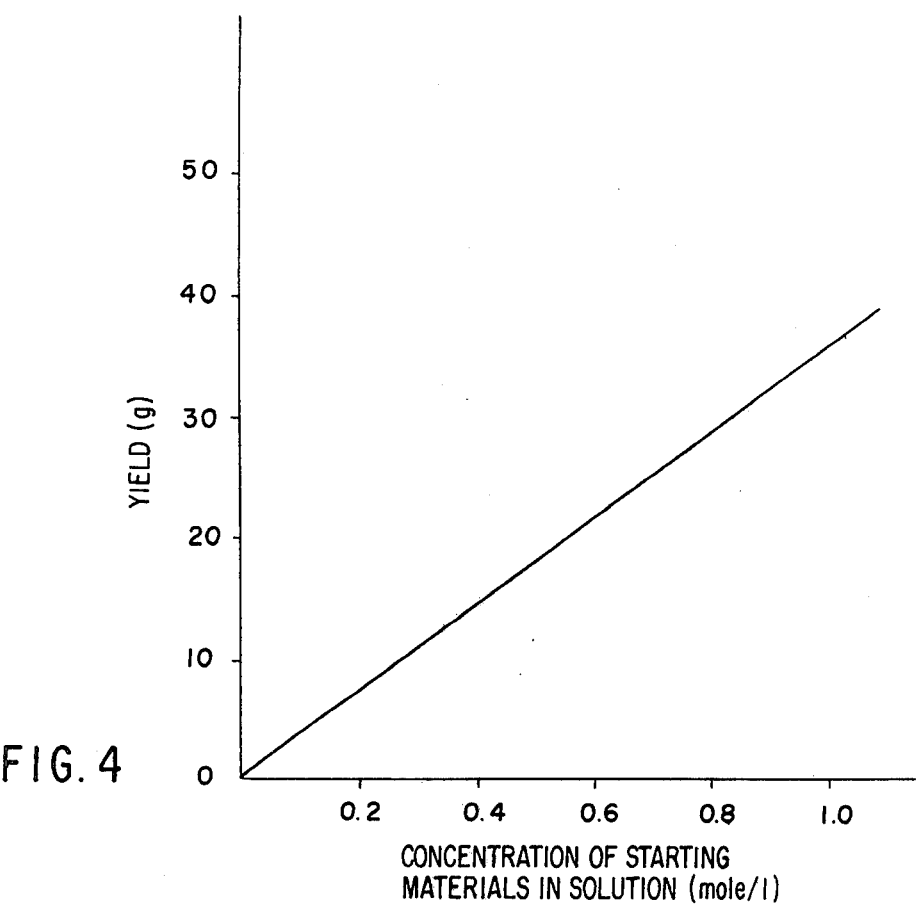
FIG. 4 is a graph which shows the relationship of the yield versus the concentration of starting materials in the solution.

When a mixture of ferrous sulfate and cobalt chloride at a ratio of 1:9 (cobalt chloride/ferrous sulfate) is used as the metal salt and sodium boron hydride is used as the reducing agent and the reactor is disposed in the field of 1000 Oe, where each solution of equimole is fed from the tanks at rates of about 0.25 cc/sec., the yields per 1 liter of the solution are as shown in the graph of FIG. 4.

The ferromagnetic particles are recovered after the reaction and are washed with ethanol and acetone and was dried at 200° C in hydrogen gas atmosphere.

The typical characteristics are shown in Table 1.

Table 1

| Sample No. | Temp. for drying (° C) | Saturation magnetization (emu/g) | Coercive force (Hc) |
|---|---|---|---|
| 1 | 200° C | 150 emu/g) | 560 Oe |
| 2 | room temp. | 134 emu/g | 748 Oe |

The ferromagnetic particles obtained by the above-mentioned process, are easily corroded with water because they are prepared by the reduction in the solution. Moreover, the corrosion of the ferromagnetic particles with water is remarkably caused in the step of removing unreacted ions and by-products salts after the reaction, whereby the deterioration of the magnetic characteristics of the ferromagnetic particles may be progressed.

Figure 5:
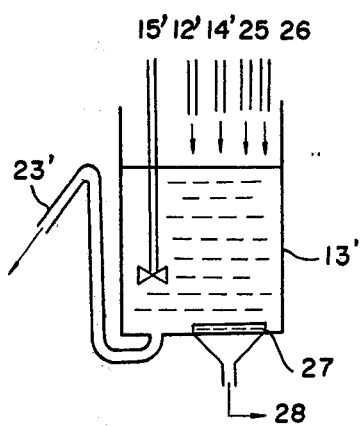
FIG. 5 is a sectional view of a washing tank used for the process of the invention.

FIG. 5 is a schematic view of an improved washing tank to overcome the troubles. In FIG. 5, a disperse-mixer 15' is disposed in the washing tank 13' and is rotated at high speed of higher than 5000 rpm. with involving air.

A pipe 12' is for feeding the reaction solution and the ferromagnetic particles from the reactor (FIG. 1) disposed above the washing tank 13'. A pipe 14' is for feeding water and a pipe 25 is for feeding an oxidizing agent and a pipe 26 is for feeding an alkali solution for pH control. A diluted slurry of the ferromagnetic particles is discharged from an outlet 23'. A filter 27 is formed at the bottom of the washing tank 13' and is connected to a suction pump (not shown).

When the mixing of the reaction solution and the ferromagnetic particles is fed into the washing tank 13', water for washing is fed through the pipe 14' at a rate of more than 30 times of that of the mixture. The ferromagnetic particles are finely dispersed and washed by the disperse-mixer 15' which is rotated at high speed.

A part of the water for washing is discharged through the filter 27 and the outlet 28. The residue of the water for washing together with the ferromagnetic particles are fed through the outlet 23' to the recovery tank (FIG. 1).

On the other hand, air is involved into the water for washing by the disperse-mixer 15'

The natural electrode potential of the ferromagnetic metal or alloy particles (made of mainly iron) rises to the passive state potential in the washing tank 13' by the incorporation of air and the addition of the oxidizing agent fed through the pipe 25 and the pH control by feeding the alkali through the pipe 26, whereby the water insoluble oxide membrane is formed on the surface of particles, and the effective anticorrosion is attained.

As it is considered from the pH-potential diagram for metal or alloy, it is necessary to contact oxygen for providing passive state potential and also necessary to control pH. The oxygen is fed by the disperse-mixer 15' and the pipe 25 and the pH is controlled by the alkali fed through the pipe 26.

The resulting ferromagnetic metal or alloy particles contain more than 70 wt.% of iron. In the passive state for said case, the pH should be higher than 7. Since the unreacted metal ions are included in the washing tank, it is necessary to control pH to neutral, preferably 6 to 8 in the washing tank. The oxidizing agent fed through the pipe 25 can be hydrogen peroxide, permanganates, chromates, nitrates and the like.

EXAMPLES AND REFERENCES

The sample I was prepared by feeding the mixture of the reaction solution and ferromagnetic particles at a rate of 50 cc/min. through the pipe 12', and feeding water at a rate of 2 liters/min., through the pipe 14' and feeding hydrogen peroxide solution at a rate of 10 cc/min. through the pipe 25 with stirring by the disperse-mixer 15' at 10000 r.p.m. whereby the sample was washed at pH of 7.

The sample II was prepared in accordance with the process for preparing the sample I except feeding 0.3 M solution of potassium permanganate at a rate of 5 cc/min. through the pipe 25.

The sample III was prepared in accordance with the process for prepareing the sample I except rotating the disperse-mixer 15' at 8000 r.p.m. in pH of 6 without adding an oxidizing agent through the pipe 25.

In the reference example, the sample was prepared in accordance with the process for preparing the sample I except feeding no air and no oxidizing agent.

The magnetic field for measurement was 5000 Oe. The results are shown in Table.

Table 1

| Sample No. | Coercive force (Oe) | Saturation magnetization (emu/g) | Squareness ratio |
|---|---|---|---|
| I | 950 | 142 | 0.55 |
| II | 1025 | 136 | 0.55 |
| III | 1025 | 105 | 0.56 |
| Reference | 986 | 92 | 0.51 |

What is claimed is:

1. A process for preparing ferromagnetic metal or alloy particles which comprises reducing ferromagnetic metal ions in a solution with a reducing agent under a magnetic field to obtain a slurry of ferromagnetic metal or alloy particles;

admixing with said slurry water in a volume quantity at least 30 times that of said slurry, and a quantity of air and at least one oxidizing agent selected from the group consisting of chromates, peroxides and permanganates sufficient to oxidize the surface of said ferromagnetic metal or alloy particles; adjusting the pH to range from about 6 to about 8; and recovering ferromagnetic metal or alloy particles having an oxidized surface.

2. A process according to claim 1 wherein the oxidizing agent is added in a washing step.

3. A process according to claim 1 wherein air is introduced in a washing step.

4. A process according to claim 1 wherein pH is controlled by adding an alkali in the washing step.

* * * * *